Figure 1:
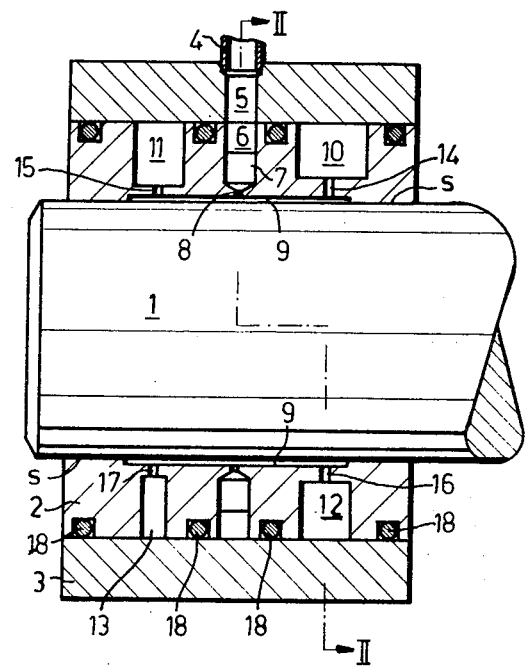

Aug. 14, 1962  E. LOCH  3,049,383
DAMPING VIBRATIONS IN A GAS BEARING
Filed June 8, 1960  2 Sheets-Sheet 1

INVENTOR.
Erwin Loch
BY *Dodge McLone*
ATTORNEYS

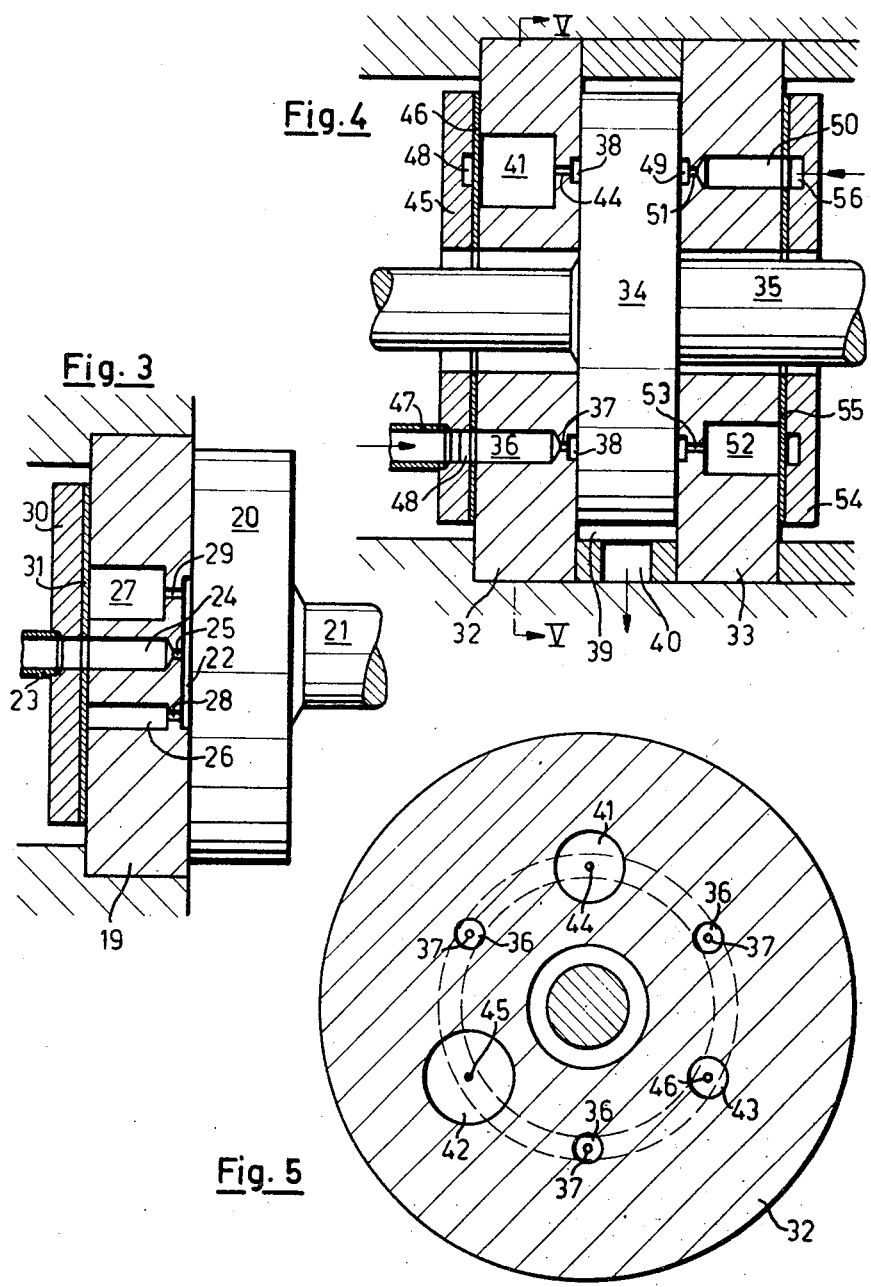

United States Patent Office
3,049,383
Patented Aug. 14, 1962

1

3,049,383
DAMPING VIBRATIONS IN A GAS BEARING
Erwin Loch, Zurich, Switzerland, assignor to Escher Wyss Aktiengesellschaft, Zurich, Switzerland, a corporation of Switzerland
Filed June 8, 1960, Ser. No. 34,658
Claims priority, application Switzerland June 26, 1959
4 Claims. (Cl. 308—9)

Gas bearings are known, in which the pressure of the supporting gas in the bearing gap, like the pressure in the oil film of a hydrodynamically lubricated bearing, is built up by the rotary movement of the shaft, due to the actual viscosity forces occurring. Furthermore, however, gas bearings are also known, in which the supporting gas is introduced into the bearing gap under pressure, the supporting capacity of the bearing being mainly produced by the aerostatic pressure of the gas supplied. In such bearings, the step is also known of machining relatively large distribution spaces in the range of the bearing gap, into which spaces the supporting gas from a pressure source is introduced through admission nozzles.

In all these bearings, there is a possibility that the member carried by the gas film or gas cushion, due to the compressibility of the gas in the bearing gap and particularly in the relatively large distribution spaces, will be set in vibration, either through self-excitation or through the effect of external interfering forces, such as unbalance.

The invention now concerns a device for damping such vibrations in a gear bearing. For this purpose, according to the invention, at least one resonator consisting of a chamber closed toward the outside and a channel connecting the chamber to the gap between the parts moving relatively to each other is provided in the bearing member, the resonator channel containing a gas column capable of oscillating in the longitudinal direction of the channel.

Figure 2:
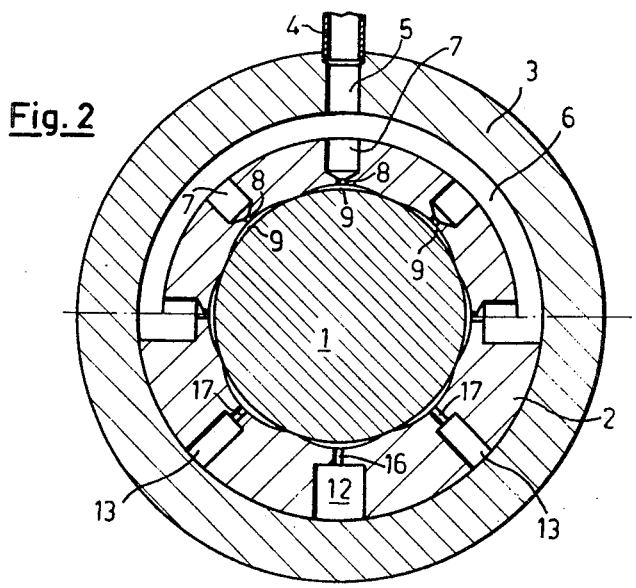

Different constructional examples of the subject of the invention are represented in simplified form in the drawings, with reference to which the mode of operation of the device will also be explained. In these drawings:

FIGURE 1 shows an axial longitudinal section through a radial bearing,

FIGURE 2 a cross-section on the line II—II in FIGURE 1,

FIGURE 3 an axial section through an axial bearing loaded in one direction,

FIGURE 4 an axial longitudinal section through an axial bearing which can be loaded in both directions, and FIGURE 5 a section on the line V—V in FIGURE 4.

According to FIGURES 1 and 2, a shaft 1 is mounted in a bearing member 2, which surrounds the shaft and is held in a supporting member 3. The supporting pressure gas, from a source not shown, is led through a pipe 4 and a bore 5, passing radially through the supporting member 3, to an annular channel 6 machined in the bearing member. From this annular channel 6 the gas passes through bores 7, distributed on the periphery of the bearing member 2 and narrowing inwardly to nozzles 8, to recesses 9 serving as distribution spaces, which are machined in the inner surface of the bearing member and extend over a certain range in the axial direction of the bearing. From these distribution spaces, the supporting gas flows to the outside through the clearance $s$ between the shaft 1 and the parts of the supporting member 2 confining the distribution spaces 9 in the axial direction. This clearance together with the distribution spaces 9 forms the gap between the parts moving relatively to each other, namely between the bearing member 2 and the shaft 1.

In order now to damp the vibrations which could be set up in consequence of the compressibility of the gas in the distribution spaces 9 and in the bearing gap $s$, a number of resonators are provided in the bearing member 2 axially on both sides of the bores 7. These resonators consist of chambers 10, 11, 12, 13 and channels 14, 15, 16, 17, respectively, which connect the chambers to the aforesaid gap. The channels 14, 15, 16, 17 here establish communication with the distribution spaces 9. Sealing rings 18 are provided for sealing the resonator chambers from the annular channel 6 and from the outside.

Resonators of this kind are known in connection with sound absorbers. According to the size of the resonator chambers and the dimensions of the resonator channels, the damping effect extends over a certain frequency range. For dimensioning of the resonators, formulae are known from the literature. For damping a frequency of the magnitude $\omega$ (angular frequency), for example, the following condition must be satisfied: $\omega^2 = (a^2 . f)/(L.V)$, where $a$ is the velocity of sound in the gas, $f$ the cross-section of the resonator channel, $L$ the effective length of the channel and $V$ the volume of the resonator chamber. By suitable choice of the geometric magnitudes $f$, $L$, $V$, the device can thus be designed for damping vibrations of a given frequency $\omega$, adjacent frequencies being, however, also strongly damped. Pressure fluctuations produced in the bearing gap by vibrations of this frequency will then be equalized by oscillations of the gas columns in the channels and periodical flow of gas into and out of the resonator chambers, so that the vibrations will not be excited continuously.

In the bearing shown in FIGURES 1 and 2, the resonator chambers 10, 11, 12, 13 and channels 14, 15, 16, 17 are of different sizes, so that the products of volume of the chamber, length of the channel and reciprocal value of the cross-section of the channel, computed for the single resonators, differ from one another. Thus, according to the frequency occurring, excitation of one or the other of the various resonators is effective.

Referring now to the axial bearing embodiment illustrated in FIG. 3, a fixed bearing disc 19 is provided having an end surface for supporting, by means of an intermediate layer of supporting gas, the end disc 20 of a rotary shaft 21. Machined in the middle of the disc 19 is a distribution space 22, to which supporting gas, from a source not shown, is supplied through a pipe 23 and a central bore 24 of the disc 19. Where it opens into the distribution space 22, the bore 24 is constricted to form a nozzle 25. In the disc 19 are provided various resonator chambers 26, 27, which are connected to the distribution space 22 by channels 28 and 29, respectively. In the axial direction, the chambers 26 and 27 are closed from the outside by a cover 30 with sealed joint 31.

In the axial bearing according to FIGURES 4 and 5, two fixed discs 32 and 33 are provided as bearing members, between which rotates a bearing disc 34 secured to shaft 35. In the disc 32 are three axially extending bores 36, serving as supply channels for the supporting gas admitted under pressure and opening through nozzles 37 into an annular distribution space 38. This distribution space 38 is machined in the face of the fixed disc 32 facing the rotating disc 34, and forms a part of the gap between the disc 32 and 34. From the distribution space 38, the gas flows radially outward through the clearance between the two discs 32 and 34 into a space 39, whence it passes to the outside through an orifice 40.

For damping the vibrations, three resonators consisting of chambers 41, 42, 43, with channels 44, 45, 46, respectively, are provided in the disc 32, the said channels establishing communication between the resonator chambers and the distribution space 38. The chambers 41, 42, 43 are closed axially on the opposite side to the distribution space 38 by a cover 45 with interposed gasket 46. A pipe 47 connected to the cover 45 serves for the supply of supporting gas from the source of pressure. For the distribution of the supporting gas among the bores 36, an annular channel 48 is machined in the cover 45, and the gasket 46 is perforated at suitable points for establishing communication between the annular channel 48 and the bores 36.

The fixed disc 33 is basically provided with the same devices. The gas is supplied to an annular distribution space 49 by bores 50 with nozzles 51, of which only one is shown in FIG. 4. Resonator chamber 52 is connected to the distribution space 49 by a channel 53. Axial closure is effected by a cover 54 with gasket 55. The bores 50 communicate with an annular channel 56 machined in the cover 54 and supplied with the necessary compressed gas by a pipe not shown.

The examples described show the use of resonators in connection with aerostatic bearings, wherein, in the bearing face recesses are provided as distribution spaces for receiving the compressed gas and wherein the danger of the occurrence of vibrations is the greatest. In this case, the resonator chambers are connected to these distribution spaces. Basically, such resonators may be employed also in aerostatic or aerodynamic bearings, in which no such distribution spaces are provided, and in which the chambers would have to be connected by the resonator channels to a point of the bearing clearance.

Means may also be provided for permitting variation of the frequency range influenced by a resonator. Thus, for example, displacement members may be inserted to a greater or lesser depth into the resonator chambers in order to vary their volume. It is also possible to provide interchangeable resonator channels with different cross-sections and/or different lengths for varying the resonance range as require.

Instead of being provided in the fixed part, the resonators may, if desired, also be provided in the moving part.

What is claimed is:

1. In a gas pressure bearing including a bearing member having a supporting surface, a supported member movable relatively to the bearing member and having a surface adjacent said supporting surface but spaced therefrom to define a bearing gap, and means for supplying compressible fluid under pressure to said gap, a vibration damping device comprising at least one resonator consisting of
    (a) a closed chamber; and
    (b) a channel connecting the chamber with the bearing gap, and containing a gas column capable of oscillating in the longitudinal direction of the channel.
2. The combination defined in claim 1 in which
    (a) said supporting surface contains at least one recess that is connected with the means for supplying fluid and forms a distribution space of the bearing gap; and
    (b) the channel is connected with the bearing gap at the recess.
3. The combination defined in claim 2 in which
    (a) there are at least two resonators; and
    (b) the quantities $f/VL$, where $f$ is the cross-sectional area of the channel, $L$ is the length of the channel and $V$ is the volume of the chamber, for the two resonators are different.
4. The combination defined in claim 3 in which
    (a) said supporting surface contains at least one recess that is connected with the means for supplying fluid and forms a distribution space of the bearing gap; and
    (b) the channel of each of the two resonators is connected with the bearing gap at the recess.

References Cited in the file of this patent

UNITED STATES PATENTS

| | | |
|---|---|---|
| 2,054,055 | Klahn | Sept. 8, 1936 |
| 2,884,282 | Sixsmith | Apr. 28, 1959 |
| 2,916,332 | Pavlecka | Dec. 8, 1959 |
| 2,937,804 | Reiner et al. | May 24, 1960 |
| 2,941,851 | Boyer | June 21, 1960 |